## 3,020,267
FLUORINATED ORGANIC COMPOUNDS AND POLYMERS THEREOF

John T. Barr, Needham, Mass., assignor to Pennsalt Chemicals Corporation, a corporation of Pennsylvania
No Drawing. Filed Nov. 17, 1955, Ser. No. 547,538
13 Claims. (Cl. 260—92.1)

This invention relates to new chlorine-substituted fluorodiolefins. More particularly it relates to chlorine-substituted fluorobutadienes, to methods for their preparation and to the intermediate compounds involved in said methods of preparation. It further relates to polymers and copolymers of said chlorine-substituted fluorodienes and to processes for their preparation.

The object of this invention is the preparation of novel polymerizable dienes with predetermined properties from which polymeric materials of superior chemical and physical properties can be prepared. At the present time there are a large number of fluorine-containing dienes which have been prepared and polymerized with the goal of obtaining a polymeric rubber-like product of high commercial value and utility at low cost. However, the majority of such dienes have had various failings when polymerized. Polymerization has been very difficult in most cases; oxidation stability of the polymers at temperatures substantially over 100° C. has been poor; and copolymerization with another monomer is usually required to get reasonable yields and acceptable properties.

It has now been found that certain highly fluorinated dienes in which the fluorine is present in alternating —$CF_2$— and =CF—CH= groupings, such as those disclosed in my co-pending application Ser. No. 421,677, filed April 7, 1954, can be modified by the substitution of chlorine for a portion of the hydrogen and fluorine in the molecule to form a diene with a molecular structure which has greatly improved stability and resistance to oxidation. Furthermore, monomeric dienes with this new modified structure can be polymerized readily into rubber-like polymers with correspondingly enhanced properties and at lower cost.

Among the advantages resulting from such monomers and polymers the following are outstanding: (1) increased chemical and physical stability and oxidation resistance of the monomers and polymers, (2) decreased tendency for spontaneous polymerization among some of the unsymmetrical partially-fluorinated dienes, resulting in simplified storage and handling of the monomers, and (3) reduced crystallinity of the rubber-like products which can be formed, resulting in enhanced physical properties and a wider usable temperature range of the polymers.

These advantages are obtained only through a careful selection of the halogen content of the diene. Not all dienes of the same empirical formula possess the desired feature embodied in my invention.

Two conditions must be met in order to obtain the compounds of my invention and a third condition should be met in order to obtain my preferred compounds, which offer maximum benefit from the halogen content of the diene. First, in order to obtain maximum oxidation resistance of the polymer, the residual double bond in the polymer must be flanked by two negative substituent groups, for example, substituted alkyl or halogen atoms, preferably at least one of which is fluorine. Thus, the diene must have the structure >C=CX—CY'=C< in which X is chlorine, fluorine, or substituted alkyl with 1 to 12 carbon atoms, and Y' is chlorine or fluorine. Secondly, the diene must have an unsymmetrical distribution of the halogens; and since it has been found that at least two fluorine atoms should be present to impart the desired tendency toward polymerization, stability and oil resistance of the polymer, this then requires that the structure of the diene be CFX=CX—CY'=CHX', where X and Y' are as defined above, and X' is hydrogen, chlorine or fluorine, and at least one of X, X' or Y' is a fluorine. The third condition which must be met for my preferred compounds is that for extreme temperature service there must be little tendency for the elements H and X to be lost from adjacent carbon atoms. To meet this most stringent requirement there should be no carbon having both a halogen and a hydrogen. This then dictates that the structure of the diene be $CF_2$=CX—CY'=$CH_2$, which is the preferred structure of this invention, X and Y' being as given above; however, where the temperature service is not as severe, say below 350° F., but where maximum resistance to oils and solvents is desired, the more highly halogenated form CFX=CX—CY'=CHX', in which X, X' and Y' are as given above, is of advantage and should be used. Also, in cases where more rubbery qualities are required, more of the halogen may be replaced by alkyl or substituted alkyl groups.

The diolefins which have been found useful in this invention may be represented by the structure $$CFX=CX—CY'=CHX'$$

where X is chlorine, fluorine, or substituted alkyl with 1 to 12 carbon atoms; X' is hydrogen, chlorine or fluorine; and Y' is chlorine or fluorine.

The preferred structure is $CF_2$=CX—CY'=$CH_2$ in which X and Y' are as described above.

A number of synthetic routes to the above diolefins will be apparent to those skilled in the art. A very convenient route is from the butenes disclosed in my co-pending application Serial No. 421,667, dated April 7, 1954, which discloses butenes of the structure $$CFXY—CXY—CH=CHX'$$

The butenes which are most useful in the synthesis of the diolefins of this invention are those in which, in the above structure, X is chlorine, fluorine, or substituted alkyl with 1 to 12 carbon atoms; Y is chlorine or bromine; and X' is hydrogen, chlorine or fluorine, with the distribution of the halogens limited by the structure of the diene desired. The hydrogen of the third carbon atom may be replaced by a halogen in some cases where direct dehalogenation is used as the route to the diene desired.

Some specific examples of starting butenes and the chlorine-substituted fluorodiolefins derived from them by the process of this invention are the following:

Butene:
    1,2-dichloro-1,1,2-trifluorobutene-3
Butadiene:
    3-chloro-1,1,2-trifluorobutadiene-1,3
    3,4-dichloro-1,1,2-trifluorobutadiene-1,3
Butene:
    1-bromo-2,2-dichloro-1,1-difluorobutene-3
Butadiene:
    2,3-dichloro-1,1-difluorobutadiene-1,3
    2,3,4-trichloro-1,1-difluorobutadiene-1,3
Butene:
    1-bromo-2-chloro-1,1,2,4-tetrafluorobutene-3
Butadiene:
    3-chloro-1,1,2,4-tetrafluorobutadiene-1,3
Butene:
    1-bromo-1,2-dichloro-1,2-difluorobutene-3
Butadiene:
    1,3-dichloro-1,2-difluorobutadiene-1,3
    1,3,4-trichloro-1,2-difluorobutadiene-1,3

In forming the dienes of this invention from the stipulated butenes it is necessary to pass through an intermediary stage comprising the formation of a new series of butanes from which the butadienes are ultimately formed by dehydrohalogenation and/or dehalogenation. This new series of butanes has the structure CFXY—CXY—CHY'—CHX'Y' in which X is chlorine, fluorine, or substituted alkyl with 1 to 12 carbon atoms; X' is hydrogen, chlorine or fluorine; Y is bromine or chlorine; and Y' is chlorine or fluorine. It will be apparent, as my invention is further described, that many butanes of a series with the above structure can be made from each of the stipulated butenes. It is not deemed necessary to make a complete listing of these possible butanes; however, for example, the following butanes of this invention can be made and in turn used to make many desired chlorine-substituted fluorinated butadienes of this invention.

Butane:
 1-bromo-2,3,4-trichloro-1,1,2-trifluorobutane
Butadiene:
 3-chloro-1,1,2-trifluorobutadiene-1,3
Butane:
 1-bromo-2,3,4,4-tetrachloro-1,1,2-trifluorobutane
Butadiene:
 3,4-dichloro-1,1,2-trifluorobutadiene-1,3
Butane:
 1-bromo-2,3,3,4-tetrachloro-1,1,2-trifluorobutane
Butadienes:
 3,4-dichloro-1,1,2-trifluorobutadiene-1,3 by dehydrohalogenation followed by dehalogenation.
 3-chloro-1,1,2-trifluorobutadiene-1,3 directly by dehalogenation.
Butane:
 1-bromo-2,2,3,4-tetrachloro-1,1-difluorobutane
Butadiene:
 2,3-dichloro-1,1-difluorobutadiene-1,3
Butane:
 1-bromo-2,3,4-trichloro-1,1,2,4-tetrafluorobutane
Butadiene:
 3-chloro-1,1,2,4-tetrafluorobutadiene-1,3

Many other examples are possible.

In a preferred embodiment of my invention conversion of the stipulated butenes to the desired butanes and then to the desired dienes is carried out by the alternate chlorination of the butene to a butane followed by dehydrochlorination of the butane until a butene is obtained which will, upon dehalogenation, produce the desired diene. The alternation may be omitted if the desired diene has halogen on both the third and fourth carbons, and the steps in the synthesis consist of (a) chlorination of the butene to a desired butane followed by (b) direct dehalogenation to the desired diene.

Chlorination of the butene and butane may be effected by any one of the means known to the art; however, for simplicity, direct use of chlorine is preferred for the process of this invention.

Dehydrohalogenation of the butane and butene may be done by any of the means known to the art, i.e., treatment wtih alcoholic potassium or sodium hydroxide solution, treatment with aqueous calcium hydroxide suspension, thermal cracking, or treatment with organic bases or ferric chloride. Dehydrohalogenation with alcoholic potassium hydroxide solution is a preferred method in my invention.

Similarly, any method known to the art may be used for dehalogenation of the butane, including heating with metallic iron or zinc, or use of sodium amalgam. The preferred method in this invention is the use of zinc dust in the presence of refluxing alcohol.

In further practicing my invention the chlorine-substituted fluorodiolefins prepared according to the instructions of this invention are subjected to polymerization conditions. The chlorine-substituted fluorobutadienes described in an earlier section of this invention, and of the structure CFX=CX—CY'=CHX', in which X is chlorine, fluorine or substituted alkyl with 1 to 12 carbon atoms; X' is hydrogen, chlorine or fluorine; and Y' is chlorine or fluorine; and of which $CF_2$=CX—CY'=$CH_2$ is a preferred form, may be homopolymerized or copolymerized readily to prepare rubber-like polymers.

Emulsion polymerization conditions are preferred but other known polymerization techniques such as mass or solution polymerization may also be used. In preferred embodiments of my invention water is mixed with the monomer or comonomers, an emulsifying agent and a catalyst or polymerization initiator are added and the mixture is agitated. The degree and rate of polymerization may advantageously be controlled by varying the amount of catalyst used and the temperature.

In preparing copolymers according to my invention the proportions of the chlorine-substituted fluorobutadiene and the comonomer used may be varied considerably within the scope of the invention, depending on the properties desired in the copolymer. For example, copolymers containing as little as 0.5 or as much as 95 mol percent of the chlorine-substituted fluorobutadiene may be used advantageously in practicing my invention. The preferred proportions are 20 to 80 mol percent of the chlorine-substituted fluorobutadiene and 80 to 20 mol percent of a comonomer.

The homopolymerization and copolymerization reactions according to my invention may be carried out at temperatures of from below 0° C. to the critical temperature of the monomer or of the mixture of monomers. The preferred reaction temperature is from 5° to 60° C.

The amount of water used in carrying out an emulsion polymerization or copolymerization is not critical, but for practical purposes it is preferred to use an amount of from 1 to 4 times the weight of the monomer or of the combined monomers. A sodium lauryl sulfate compound known under the trade name of Dupanol WA or Dupanol ME has been used as emulsifying agent in the polymerization and copolymerization reactions of this invention, although other conventional emulsifying agents may also be used. The amount of emulsifying agent may be varied from about 0.1% to about 15% of the weight of the monomer, or of the combined monomers, although the preferred amount is from 1% to 10%.

A number of materials are known to the art as emulsion polymerization catalysts or initiators and almost any of these may be used. A few examples of such materials are oxygen, ozone, hydrogen peroxide, benzoyl peroxide, cumene hydroperoxide and other organic peroxides, organic ozonides, percarbonates perborates, perchlorates, and persulfates. The preferred catalysts for emulsion polymerizations in the practice of my invention are the persulfates of ammonium, sodium and potassium. The speed of the emulsion polymerization reaction is partially dependent on the amount of catalyst used, and in operating the process of my invention with potassium persulfate as catalyst, the amount may be varied from about 0.05% to as much as 4% of the weight of the monomer or combined monomers although the preferred amount is from 0.5% to 2.5%.

A number of catalysts are known to the art as mass polymerization catalysts or initiators and almost any of these may be used. A few examples of such materials are organic peroxides, such as acetyl, benzoyl, tertiary butyl or cumene hydroperoxide and $\alpha,\alpha'$ azodi-isobutyronitrile. Other useful initiators are ultraviolet light, sunlight, ozone and certain radioactive materials. The preferred catalysts for mass polymerizations in the practice of my invention are acetyl and benzoyl peroxides and $\alpha,\alpha'$ azodi-isobytryronitrile. The speed of the mass polymerization is partially dependent on the amount of catalyst used, and in operating the process of my invention with the preferred catalysts the amount may be varied from about 0.001% to as much as 5% of the weight of monomer of combined monomers, although the preferred amount is from 0.1% to 1%.

It is clear to those skilled in the art that since the temperature and amount of catalyst affect the rate of reaction, they also affect the reaction time. With this understood, it becomes apparent that the reaction time can be varied over a wide range, depending upon the particular conditions used and the degree of polymerization desired. In general a reaction time of from 5 to 60 hours has been found to be suitable and practical, although good results may also be obtained using less than 5 hours or longer than 60 hours.

Auxiliary polymerization agents known to the art, although not essential to the operation of my invention, may be used to advantage. For example, a small amount of sodium bisulfite added initially helps to activate the polymerization catalyst and thus promotes the start of the reaction. A small amount of buffer, such as borax, is also helpful in preventing changes in pH caused by slight hydrolysis of the reactants. A small amount of a mercaptan, such as tertiary dodecyl mercaptan, is effective in regulating the polymer molecular weight and preventing the formation of excessively high molecular weight products from certain monomer pairs.

Although one of the objects of my invention is to make available new copolymers of chlorine-substituted fluorobutadienes with other monomers, it is to be understood also that in some cases the products of my invention may contain homopolymers of the monomer used in excess in addition to the said copolymers. This is particularly true when the copolymerization is carried out using only a very small proportion of one of the monomers. One special value of the copolymerization process under those conditions is that it provides an added means of widely varying the range of chemical and physical properties which can be obtained.

In general the homopolymers and copolymers of chlorine-substituted fluorobutadienes which have the most valuable properties are thermoplastic solids, although valuable products ranging from viscous liquids to hard solids at ordinary temperatures may also be prepared, depending on the application desired, by varying the degree of polymerization of the monomer or monomers and by selection of a suitable comonomer to obtain a desired copolymer with predetermined properties. Copolymeric products prepared according to my invention may contain from 0.5 to 95 mol percent combined chlorine-substituted fluorobutadiene and from 99.5 to 5 mol percent of one or more combined comonomers, but preferred products contain from 20 to 80 mol percent combined chlorine-substituted fluorobutadienes with themselves or with other comonomers.

The preferred homopolymers are those prepared from dienes with the structure $CF_2=CX-CY'=CH_2$, in which X is chlorine, fluorine, or substituted alkyl with 1 to 12 carbon atoms and Y' is chlorine or fluorine. A specific example of such a preferred homopolymer is the homopolymer of 3-chloro-1,1,2-trifluorobutadiene-1,3, $$CF_2=CF-CCl=CH_2$$

a monomer possessing the above stipulated structure and in which structure X is fluorine and Y' is chlorine. Other specific examples are homopolymers of the following: 4-chloro1,1,-2-trifluorobutadiene-1,3; 3,4-dichloro-1,1,2-trifluorobutadiene-1,3; 2,3-dichloro-1,1-difluorobutadiene-1,3; 2,3,4-trichloro-1,1-difluorobutadiene-1,3; 3-chloro-1,1,2,4-tetrafluorobutadiene-1,3; 1,3-dichloro-1,2-difluorobutadiene-1,3; 1,3,4-trichloro-1,2-difluorobutadiene-1,3; 2-trifluoromethyl-1,1-difluorobutadiene-1,3; 3-chloro-2-pentafluoroethyl-1,1-difluorobutadiene-1,3; and 2-chloro-3-trifluoromethyl-1,1-difluorobutadiene-1,3.

Copolymers made according to my invention include polymeric products of chlorine-substituted fluorobutadienes with other polymerizable organic monomers having at least one ethylenic linkage and the structure

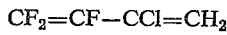

in which X and X' are selected from the group consisting of hydrogen and fluorine; Y is selected from the group consisting of hydrogen, fluorine, and lower alkyl with 1 to 12 carbon atoms; and Y' is selected from the group consisting of hydrogen, chlorine, fluorine, alkyl with 1 to 12 carbon atoms, substituted alkyl with 1 to 12 carbon atoms, carbalkoxy, aryl or substituted aryl. Examples of some of these are ethylene, vinyl chloride, acrylonitrile, styrene, 2,2,2-trifluoroethyl vinyl ether, 2,2,2-trifluoroethyl acrylate, perfluorobutadiene-1,3, methyl acrylate, methyl methacrylate, butadiene, etc.

Polymeric products of my invention which have the most valuable properties are rubbery solids, although valuable products ranging from viscous liquids to hard solids at ordinary temperatures may also be prepared, depending upon the application desired, by varying the degree of polymerization, and in the case of copolymers, use of a selected comonomer which will result in a product with the predetermined properties desired.

Rubbers prepared by curing the polymeric products of this invention have superior mechanical properties as compared to other highly fluorinated rubbers or rubbery polymers. They also have outstanding resistance to solvents, oils, oxygen, sunlight, heat, aging, acids, alkalies, and other chemicals, and are particularly useful where resistance to these is necessary, as for example in the chemical process and allied industries. Examples of especially valuable applications include gaskets, packings, flexible piping, hose, linings, coatings, chemically resistant gloves and boots, wire coating, etc.

The invention and its practice are further illustrated by the following examples, in which the parts are by weight.

EXAMPLE I

*Preparation of 3-chloro-1,1,2-trifluorobutadiene-1,3*

Chlorine was passed into a solution of 1-bromo-2-chloro-1,1,2-trifluorobutene-3 in an equal part of carbon tetrachloride until the weight increase of the solution indicated that the theoretical amount of chlorine required just to saturate the double bond had been absorbed. Distillation gave a 90% yield of 1-bromo-2,3,4-trichloro-1,1,2-trifluorobutane (B.P. 180–183° C., $n_D^{25}$ 1.4540), and an 8% yield of a mixture of 1-bromo-2,3,4,4-tetrachloro-1,1,2-trifluorobutane and 1-bromo-2,3,3,4-tetrachloro-1,1,2-trifluorobutane, but predominantly the former (B.P. 96–99° C. at 12 mm., $n_D^{27}$ 1.4718).

Dehydrochlorination of the 1-bromo-2,3,4-trichloro-1,1,2-trifluorobutane by KOH in alcohol at 0 to 10° C. gave an 83% yield of 1-bromo-2,3-dichloro-1,1,2-trifluorobutene-3 (B.P. 132–134° C., $n_D^{28}$ 1.4330).

The 1-bromo-2,3-dichloro-1,1,2-trifluorobutene-3 was then dehalogenated by dropping it into a refluxing suspension of zinc dust in alcohol containing a little t-butylcatechol. The mixture was refluxed 1/3 hours, then cooled and filtered. Addition of 2 volumes of water and a little HCl to the filtrate resulted in the formation of a lower layer which was separated, washed, dried and distilled. The product was 3-chloro-1,1,2-trifluorobutadiene-1,3 (B.P. 54° C., $n_D^{28}$ 1.3835). A conversion of 43.5% was obtained.

The 3-chloro-1,1,2-trifluorobutadiene-1,3 was homopolymerized in 90% conversion to form a soft elastomer which was vulcanized into a strong rubbery material. It was copolymerized in 3:1 ratio with styrene to 73% conversion. It was also copolymerized with trifluoroethyl vinyl ether in 1:1.36 ratio to 63% conversion.

The high boiling mixture of 1-bromo-2,3,4,4-tetrachloro-1,1,2-trifluorobutane and 1-bromo-2,3,3,4-tetrachloro-1,1,2-trifluorobutane was dehalogenated directly and the isomer 4-chloro-1,1,2-trifluorobutadiene was isolated. This diene was also polymerized to a soft elastomer which vulcanized to a strong rubbery material.

EXAMPLE II

*Preparation of 4-chloro-1,1,2-trifluorobutadiene-1,3*

Excess chlorine was passed into a 1:1 solution of 1-bromo-2-chloro-1,1,2-trifluorobutene-3 in carbon tetrachloride at reflux in the presence of ultraviolet light irradiation beyond the weight required to saturate the double bond. Distillation gave a 50% yield of the adduct, 1-bromo-2,3,4-trichloro-1,1,2-trifluorobutane, and a 35% yield of 1-bromo-2,3,4,4-tetrachloro-1,1,2-trifluorobutane (B.P. 103 to 107° C. at 17 mm., $n_D^{26}$ 1.4700).

250 g. of the 1-bromo-2,3,4,4-tetrachloro-1,1,2-trifluorobutane were added dropwise to 60 g. of zinc dust in 500 ml. of refluxing alcohol and refluxed for 2 hours. Dilution of the mixture with water gave a lower layer which was washed, dried and distilled to give 65 g. of 4-chloro-1,1,2-trifluorobutadiene-1,3 (B.P. 70 to 73° C.).

EXAMPLE III

*Preparation of 3,4-dichloro-1,1,2-trifluorobutadiene*

Chlorine was passed into a 1:1 solution of 1-bromo-2,3-dichloro-1,1,2-trifluorobutene-3 in carbon tetrachloride at 50 to 60° C. until the double bond was saturated. An 85% yield of 1-bromo-2,3,3,4-tetrachloro-1,1,2-trifluorobutane (B.P. 109° C. at 25 mm., $n_D^{24}$ 1.4755) was recovered on distillation.

Dehydrochlorination of this butane at 10 to 15° C. by KOH in alcohol gave a 75% yield of 1-bromo-2,3,4-trichloro-1,1,2-trifluorobutene-3, (B.P. 85–86° C. at 85 mm., $n_D^{24}$ 1.4580).

Dehalogenation of this butene by zinc dust in boiling ethanol gave a 40% conversion to 3,4-dichloro-1,1,2-trifluorobutadiene-1,3 (B.P. 85–90° C., $n_D^{24}$ 1.4116).

This same diene was obtained by dehydrochlorination of the mixture of 1-bromo-2,3,4,4-tetrachloro-1,1,2-trifluorobutane and 1-bromo-2,3,3,4-tetrachloro-1,1,2-trifluorobutane of Example 1, followed by dehalogenation of the resulting butene.

The 3,4-dichloro-1,1,2-trifluorobutadiene-1,3 was homopolymerized with 61% conversion to a soft elastomer and vulcanized to a stiff, strong rubbery material.

Copolymerization of the 3,4-dichloro-1,1,2-trifluorobutadiene-1,3 with trifluoroethyl vinyl ether resulted in a 27% conversion to a soft, weak product.

EXAMPLE IV

In order to compare the added storage stability of 3-chloro-1,1,2-trifluorobutadiene-1,3 over similar dienes not possessing the 3-halo structure, ampoules were charged with it and some similar dienes under vacuum conditions and sealed. The following samples were prepared and treated as indicated:

| Ampoule | Monomer | Parts | Added Material |
|---|---|---|---|
| 1 | 1,1,2-trifluorobutadiene-1,3 | 10 | None. |
| 2 | 3-chloro-1,1,2-trifluorobutadiene-1,3. | 10 | Do. |
| 3 | do | 10 | Do. |
| 4 | do | 10 | α,α' azodi-isobutyronitrile, 0.01 part. |
| 5 | do | 10 | t-butyl catechol, 0.1 part. |
| 6 | 1,1,2-trifluorobutadiene-1,3 | 10 | t-butyl catechol, 0.1 part. |

Ampoules 1, 2, 3, 5, and 6 were stored at 25°±2° C. and ampoule 4 at 65° C. for 24 hours. At the end of 24 hours both samples of 1,1,2-trifluorobutadiene-1,3 showed definite changes. The contents of ampoule 1 were completely solid, and the contents of ampoule 6, despite the presence of a normally effective polymerization inhibitor, were an extremely viscous liquid. On the other hand the samples of 3-chloro-1,1,2-trifluorobutadiene-1,3 in ampoules 2, 3, and 5 were unchanged. Ampoule 4, which contained the polymerization promoter in addition to the 3-chloro-1,1,2-trifluorobutadiene-1,3, contained a plug of rubbery solid product of high tensile strength. Ampoule 2 was maintained at 65° C. for an additional period of time. In the first additional day at this temperature a noticeable increase in viscosity occurred. After a week at 65° C. the material would not flow. Ampoules 3 and 5, containing 3-chloro-1,1,2-trifluorobutadiene-1,3 were kept at 25°±3° C. for three months at which time the contents of ampoule 3 were very viscous, but the contents of ampoule 5 showed no noticeable change from its appearance when charged.

EXAMPLE V

A pressure reactor was charged with 100 parts 3-chloro-1,1,2-trifluorobutadiene-1,3, 180 parts water, 5 parts Dupanol WA, 4 parts borax, 4 parts potassium persulfate, 4 parts sodium bisulfite, and 1 part tertiary dodecyl mercaptan. The void space was purged with nitrogen, and the reactor was sealed. The reactor was heated at 50° C. and rotated at 29 r.p.m. for 24 hours. 90 parts of soft white rubbery products were obtained.

100 parts of product were compounded and milled with 1 part paraffin, 40 parts Philblack O (carbon black), 0.5 part 2-mercaptoimidiazol, and 1 part benzothiazyl disulfide. The product was cured at 310° F. and 500 p.s.i.g. for 30 minutes to give a strong rubbery sheet possessing good physical properties.

EXAMPLE VI

A pressure reactor was charged with 100 parts 3-chloro-1,1,2-trifluorobutadiene-1,3, 180 parts water, 1 part potassium persulfate, 0.5 part borax, 0.5 part sodium bisulfite, and 3 parts Dupanol ME. The void space was purged with nitrogen, the unit sealed and heated at 50° C. for 24 hours while being rotated at 29 r.p.m. In duplicate runs 98.7 and 91.2 parts of soft white rubbery product were obtained.

EXAMPLE VII

A pressure reactor was charged with 100 parts 3-chloro-1,1,2-trifluorobutadiene-1,3, 150 parts water, 0.75 part potassium persulfate and 2.5 parts Aerosol OT, the dioctyl ester of sodium sulfosuccinic acid. The charge was treated as in Example VI. 92.5 parts of soft white rubbery polymer were obtained.

EXAMPLE VIII

A pressure reactor was charged with 100 parts 3,4-dichloro-1,1,2-trifluorobutadiene-1,3, 180 parts water, 5 parts Dupanol WA, 4 parts borax, 4 parts potassium persulfate, 4 parts sodium bisulfite, and 1 part tertiary dodecyl mercaptan. The charge was treated as under Example VI. 91 parts of a tough white rubbery product were obtained. This product was vulcanizable by conventional curing procedures to a very strong rubbery stock.

EXAMPLE IX 100 parts 3-chloro-2-(2,2,2-trifluoroethyl)-1,1-difluorobutadiene-1,3 were polymerized for 40 hours using the recipe and procedures of Example VI. 53 parts of soft rubbery product were obtained.

EXAMPLE X 100 parts 3-chloro-2-pentafluoroethyl-1,1-difluorobutadiene-1,3 were polymerized for 21 hours using the recipe and procedures of Example VI. 48 parts of a weak rubbery product were obtained.

EXAMPLE XI 100 parts 2-chloro-3-methyl-1,1-difluorobutadiene-1,3 were polymerized for 8 hours using the recipe and procedures of Example VI. 73 parts of strong rubbery product were obtained.

EXAMPLE XII 100 parts 2,3,4-trichloro-1,1-difluorobutadiene-1,3 were polymerized for 40 hours using the recipe and procedures of Example VI. 36 parts of tough hard product were obtained.

EXAMPLE XIII 55 parts of 3-choloro-1,1,2-trifluorobutadiene-1,3 were mixed with 45 parts 2,2,2-trifluoroethyl vinyl ether and polymerized for 20 hours using the recipe and procedures of Example VI. 55 parts of very rubbery product were obtained.

EXAMPLE XIV 87.5 parts 3-chloro-1,1,2-trifluorobutadiene-1,3 were mixed with 12.5 parts acrylonitrile and polymerized for 20 hours using the recipe and procedures of Example VI. 16 parts of a sticky plastic product were obtained.

EXAMPLE XV 75 parts 3-chloro-1,1,2-trifluorobutadiene-1,3 were mixed with 25 parts 2,2,2-trifluoroethyl acrylate and polymerized for 20 hours using the recipe and procedures of Example VI. 82 parts of strong rubbery product were obtained.

EXAMPLE XVI 75 parts 3-chloro-1,1,2-trifluorobutadiene-1,3 were mixed with 25 parts styrene and polymerized for 20 hours using the recipe and procedures of Example VI. 90 parts of stiff rubbery product were obtained.

EXAMPLE XVII 52.5 parts 3-chloro-1,1,2-trifluorobutadiene-1,3 were mixed with 47.5 parts perfluorobutadiene-1,3 and polymerized for 25 hours using the recipe and procedures of Example VI. 45 parts of soft rubbery product were obtained.

EXAMPLE XVIII 75 parts 3,4-dichloro-1,1,2-trifluorobutadiene-1,3 were mixed with 25 parts styrene and polymerized for 18 hours using the recipe and procedures of Example VI. 70 parts of resinous product were obtained.

EXAMPLE XIX 75 parts 3,4-dichloro-1,1,2-trifluorobutadiene-1,3 were mixed with 25 parts acrylonitrile and polymerized for 18 hours using the recipe and procedures of Example VI. 25 parts of resinous product were obtained.

It will be obvious to those skilled in the art that many modifications may be made within the scope of the present invention without departing from the spirit thereof and the invention includes all such modifications.

From the detailed specific examples and the general discussion presented, it will be evident that this invention provides a series of novel polymerizable chemical compounds and intermediate compounds, including methods for their preparation, and further provides a series of novel homo- and copolymeric products and processes for their preparation. The compounds are relatively simple to prepare from easily available starting materials and may readily be made in available equipment commonly used in the art. In addition to the important role played by the intermediate compounds in the preparation of the ultimate products, the intermediate compounds themselves possess valuable properties which make them useful as solvents and as intermediary chemicals in the preparation of other chemical compounds.

From the foregoing disclosures it is clear that incorporation of chlorine into the fluorine-containing monomer, according to this invention, results in new monomers and polymers and intermediate products possessing important new characteristics which can be used to advantage in a large number of commercial products.

I claim:

1. A polymer selected from the group consisting of polymeric $CF_2=CF-CCl=CH_2$, $CF_2=CF-CH=CHCl$ and $CF_2=CF-CCl=CHCl$.

2. A homopolymer of $CF_2=CF-CCl=CH_2$.

3. A homopolymer of $CF_2=CF-CH=CHCl$.

4. A homopolymer of $CF_2=CF-CCl=CHCl$.

5. A compound selected from the group consisting of $CF_2=CF-CCl=CH_2$, $CF_2=CF-CH=CHCl$ and $$CF_2=CF-CCl=CHCl$$

6. A compound having the formula $$CF_2=CF-CCl=CH_2$$

7. A compound having the formula $$CF_2=CF-CH=CHCl$$

8. A compound having the formula $$CF_2=CF-CCl=CHCl$$

9. A process for preparing a homopolymer of a monomer selected from the group consisting of $$CF_2=CF-CCl=CH_2$$
$$CF_2=CF-CH=CHCl \text{ and}$$
$$CF_2=CF-CCl=CHCl$$

which comprises polymerizing said monomer in the presence of a free radical producing catalyst at a temperature in the range from below about 0° to about 100° C. for 5 to 60 hours.

10. A process for preparing a homopolymer of a monomer selected from the group consisting of $$CF_2=CF-CCl=CH_2$$
$$CF_2=CF-CH=CHCl \text{ and}$$
$$CF_2=CF-CCl=CHCl$$

which comprises mixing the monomer with 1 to 4 parts of water, 0.1% to 15% by weight of monomer of emulsifying agent, 0.001% to 5% by weight of monomer of a free radical producing catalyst and agitating and polymerizing the mixture at a temperature in the range of from about 5° C. to about 60° C. for from 5 to 60 hours.

11. The process that comprises chlorinating 1-bromo-2,3-dichloro-1,1,2-trifluorobutene-3, recovering 1-bromo-2,3,3,4-tetrachloro-1,1,2-trifluorobutane as product, dehydrochlorinating said product to form 1-bromo-2,3,4-trichloro-1,1,2-trifluorobutene-3 and debromodechlorinating said latter butene to remove the bromine atom from the first carbon atom and the chlorine atom from the second carbon atom to form 3,4-dichloro-1,1,2-trifluorobutadiene-1,3.

12. The process that comprises chlorinating 1-bromo-2-chloro-1,1,2-trifluorobutene-3, recovering 1-bromo-2,3,4-trichloro-1,1,2-trifluorobutane as product, dehydrochlorinating said product to form 1-bromo-2,3-dichloro-1,1,2-trifluorobutene-3 and debromo-dechlorinating said latter butene to remove the bromine atom from the first carbon atom and the chlorine atom from the second carbon atom to form 3-chloro-1,1,2-trifluoro-butadiene-1,3.

13. The process that comprises chlorinating 1-bromo-2-chloro-1,1,2-trifluorobutene-3, recovering 1-bromo-2,3,4,4-tetrachloro-1,1,2-trifluorobutane as a product, debromodechlorinating said product to remove the bromine atom from the first carbon atom and one atom of chlorine from the fourth carbon atom to form 4-chloro-1,1,2-triflurobutadiene-1,3.

References Cited in the file of this patent

UNITED STATES PATENTS

| | | |
|---|---|---|
| 2,647,110 | Wiseman | July 28, 1953 |
| 2,681,942 | Ruh et al. | June 22, 1954 |
| 2,686,207 | Crane et al. | Aug. 10, 1954 |
| 2,749,376 | Tarrant et al. | June 5, 1956 |
| 2,750,431 | Tarrant et al. | June 12, 1956 |

FOREIGN PATENTS

| | | |
|---|---|---|
| 856,145 | Germany | Nov. 20, 1952 |

UNITED STATES PATENT OFFICE
CERTIFICATE OF CORRECTION

Patent No. 3,020,267 February 6, 1962

John T. Barr

It is hereby certified that error appears in the above numbered patent requiring correction and that the said Letters Patent should read as corrected below.

Column 4, line 71, for "-isobytryronitrile" read -- -isobutyronitrile --; column 5, line 68, after "-1,3-," second occurrence, insert -- 3-chloro- --; column 8, line 59, for "cholro" read -- chloro --; column 9, line 7, for "choloro" read -- chloro --.

Signed and sealed this 29th day of May 1962.

(SEAL)
Attest:

ERNEST W. SWIDER
Attesting Officer

DAVID L. LADD
Commissioner of Patents